United States Patent [19]

Shaw et al.

[11] 4,310,116
[45] Jan. 12, 1982

[54] METHOD FOR PRODUCING SOLAR COLLECTOR PANELS

[75] Inventors: Anthony R. Shaw, Waterville; Wallace F. Krueger, Toledo; Lloyd E. Bastian, Perrysburg, all of Ohio

[73] Assignee: Libbey-Owens-Ford Company, Toledo, Ohio

[21] Appl. No.: 127,169

[22] Filed: Mar. 4, 1980

Related U.S. Application Data

[62] Division of Ser. No. 950,511, Oct. 11, 1978, Pat. No. 4,231,505.

[51] Int. Cl.³ .............................................. B23K 3/06
[52] U.S. Cl. .................................. 228/183; 228/224; 228/244
[58] Field of Search ............... 29/157.3 C; 228/14, 228/183, 224, 244, 173 A, 173 C; 126/447

[56] References Cited

U.S. PATENT DOCUMENTS

| | | | |
|---|---|---|---|
| 891,380 | 2/1908 | Sharp | 228/14 |
| 1,948,379 | 2/1934 | Helle | 228/14 X |
| 2,311,579 | 2/1943 | Scott | 126/447 X |
| 3,236,992 | 2/1966 | Roberts | 228/224 X |
| 4,072,262 | 2/1978 | Godrick | 228/183 X |
| 4,074,406 | 2/1978 | Boyd et al. | 29/157.3 C |

Primary Examiner—Mark Rosenbaum
Assistant Examiner—Kenneth J. Ramsey
Attorney, Agent, or Firm—Collins, Oberlin & Darr

[57] ABSTRACT

A method of and apparatus for fabricating a solar collector panel including providing a thermal conductive, heat absorbing plate having a plurality of grooves therein, feeding discrete lengths of solder strips having transverse curvatures into said grooves, respectively, placing a tube assembly having a plurality of conduits into said grooves of said plate is superimposed relation on said solder strips, holding said loose assembly together, and heating the loose assembly to melt the solder and effect a thermal conductive bond between said tube assembly and said plate.

3 Claims, 16 Drawing Figures

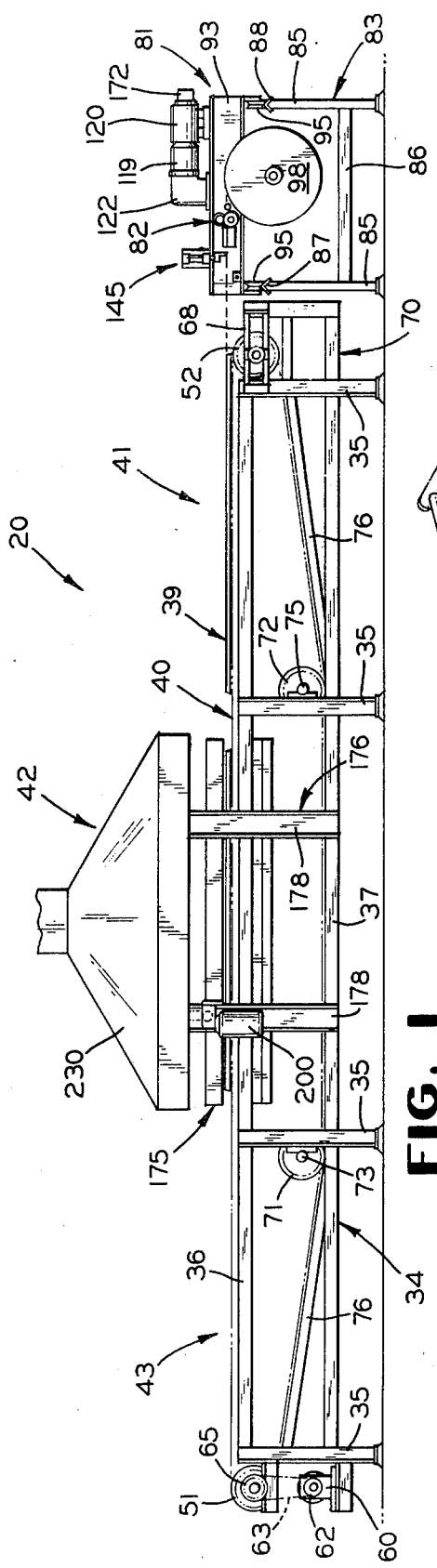
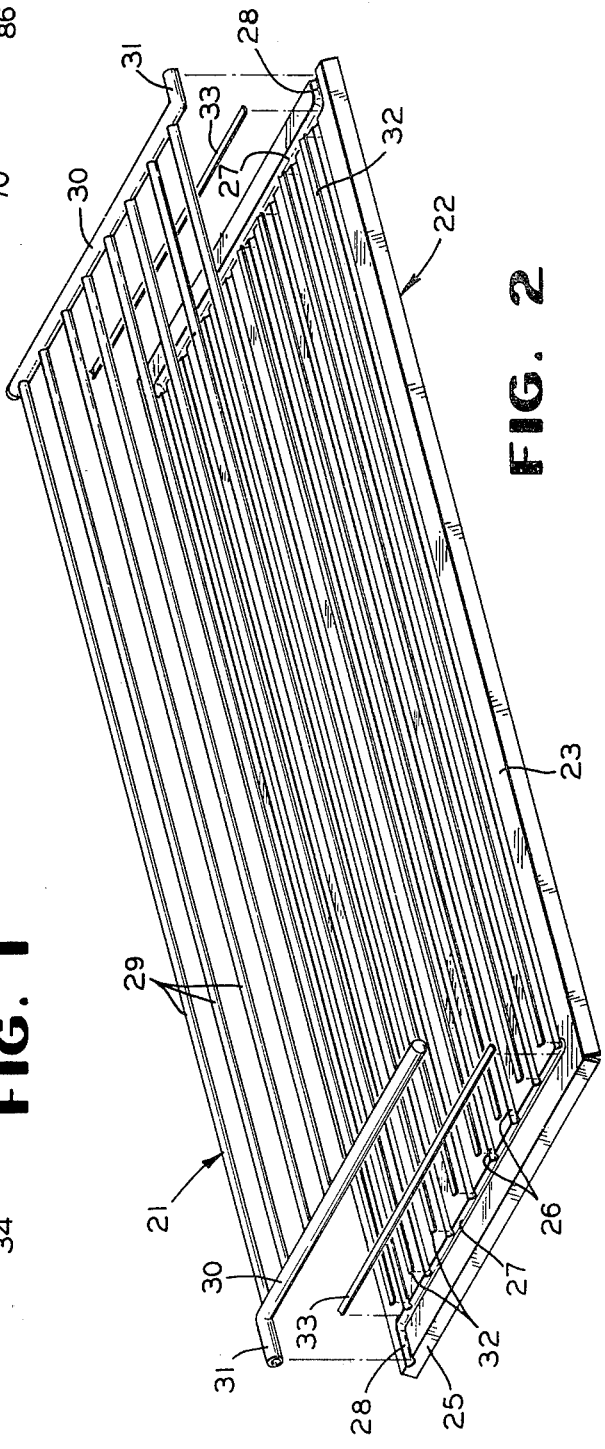
FIG. 1
FIG. 2

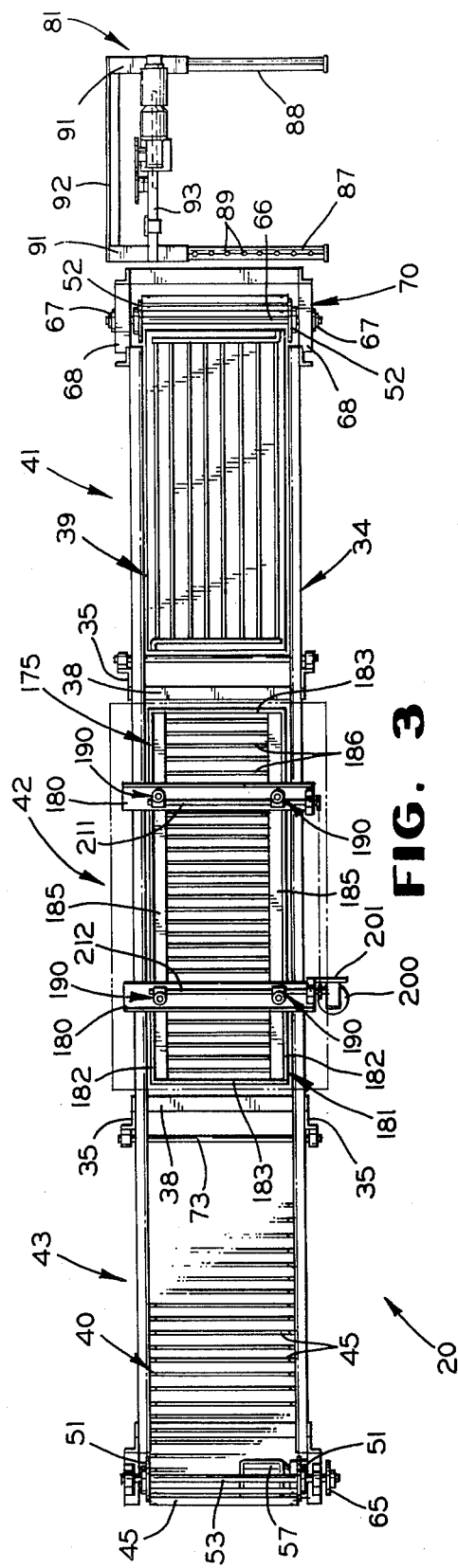
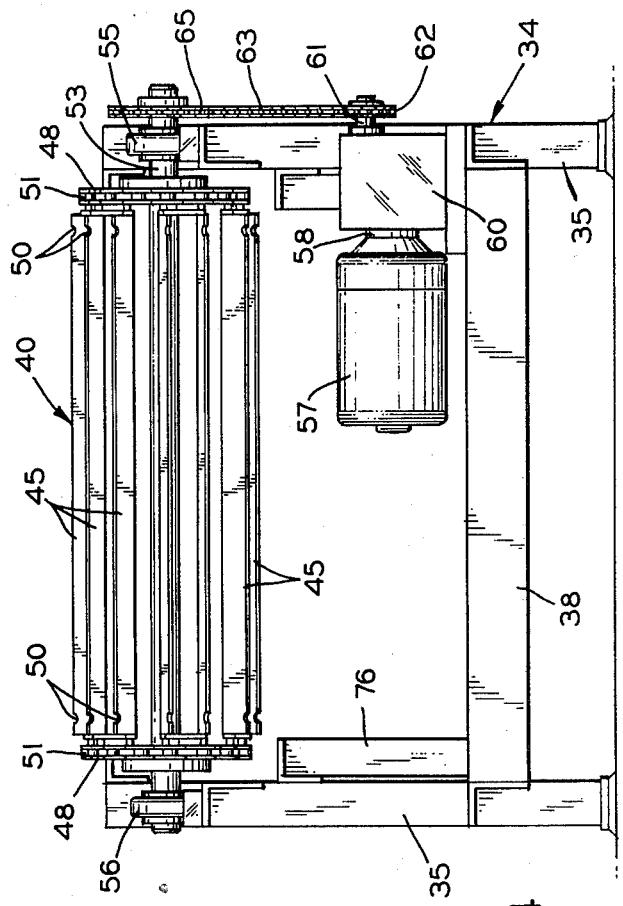
FIG. 3
FIG. 4

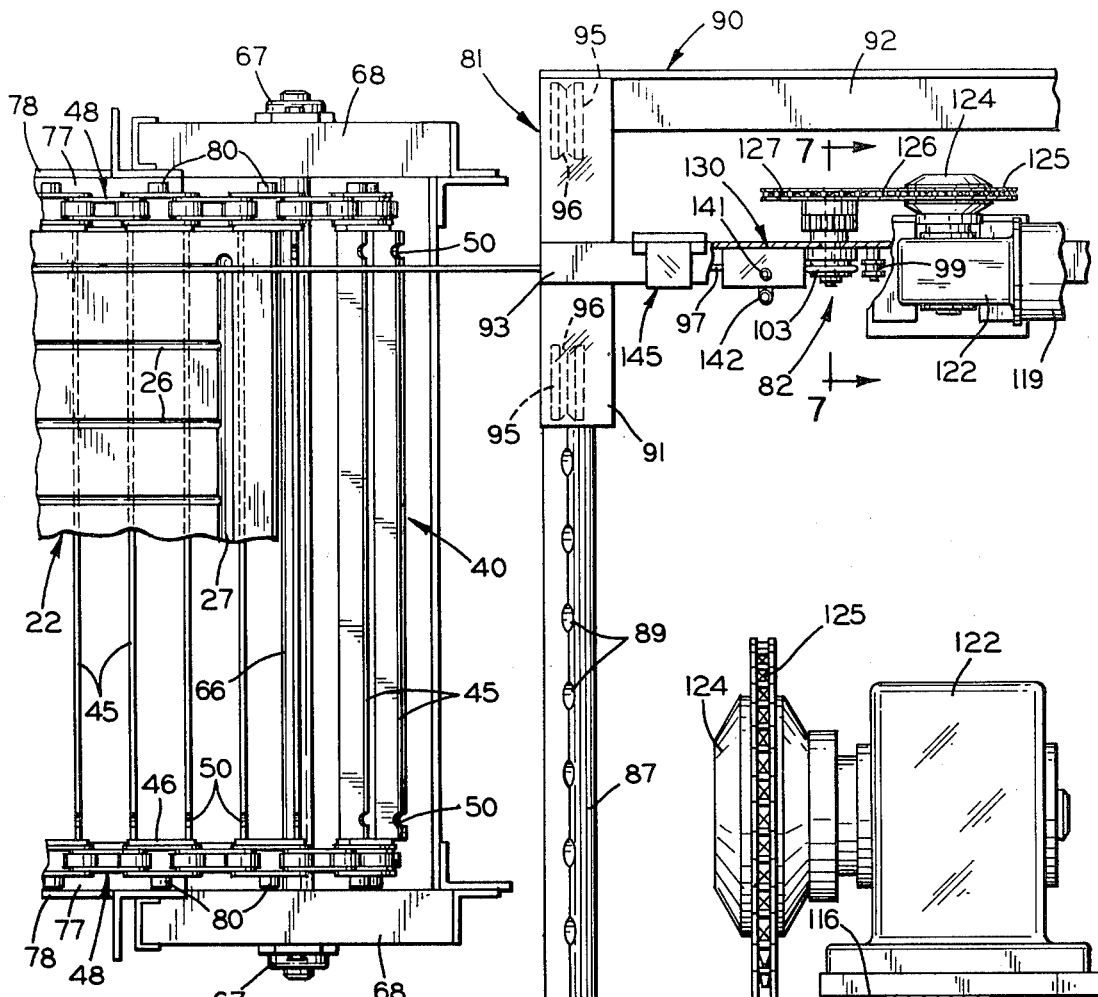
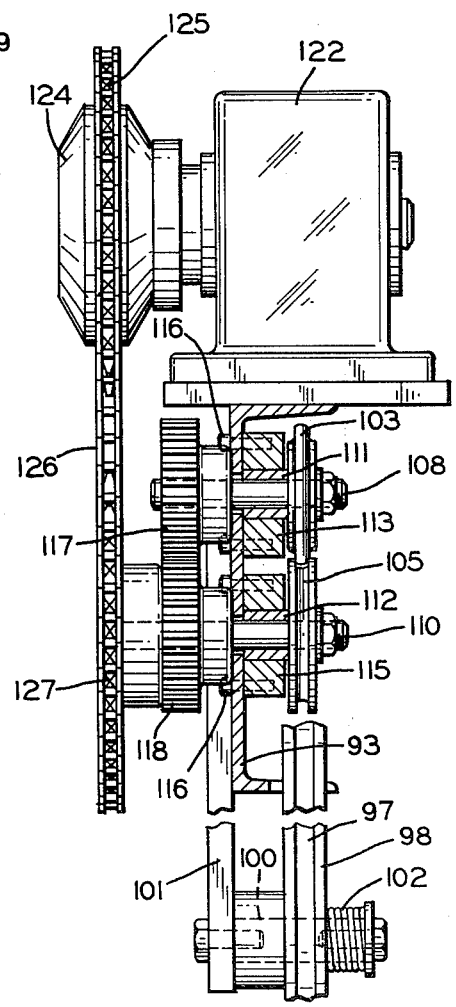
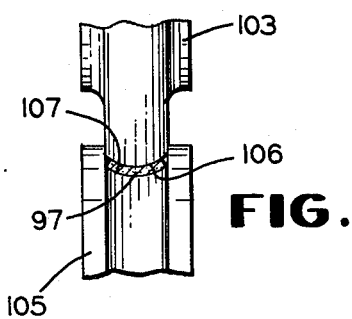
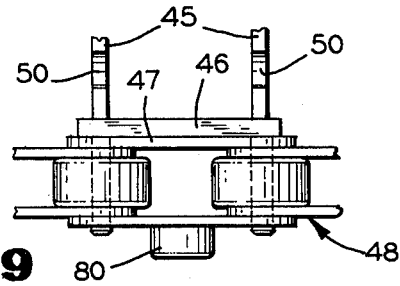

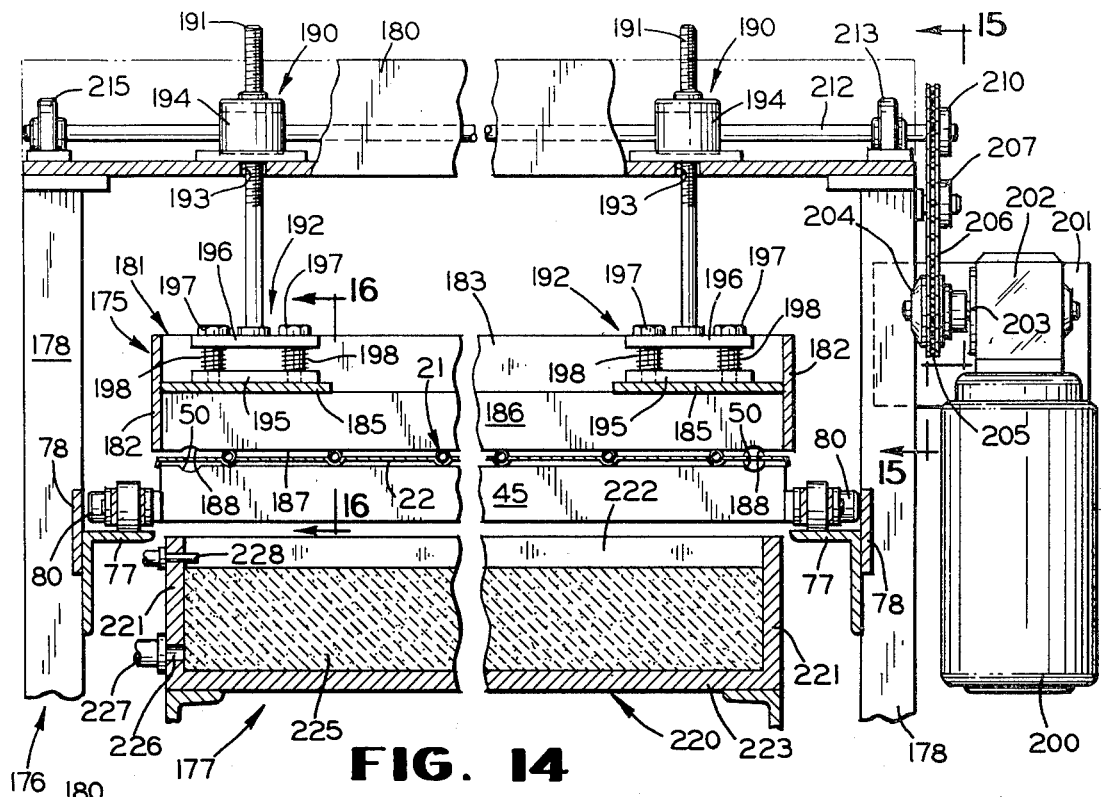

4,310,116

METHOD FOR PRODUCING SOLAR COLLECTOR PANELS

This is a division of application Ser. No. 950,511 filed Oct. 11, 1978 now U.S. Pat. No. 4,231,505 issued Nov. 4, 1980.

BACKGROUND OF THE INVENTION

The present invention relates generally to the fabrication of solar energy collector units and, more particularly, to a soldering apparatus for securing a tubular piping system to a heat-absorbing plate.

In recent years, much attention has been directed to the development of solar energy collectors in an effort to harness the virtually unlimited and free source of energy provided by the sun. This development has been accelerated by the ever-increasing costs and dwindling supplies of the conventional fossil fuel energy sources. One of the more popular of the various solar energy collection devices proposed is the so-called "flat-plate" collector. This type of collector includes a generally flat heat or energy absorbing plate to which is attached a fluid conveying piping or conduit system. The heat energy absorbed by the plate is transferred via the conduit system to the fluid passing therethrough and is subsequently extracted at a remote location as heat energy for whatever purpose desired.

While such known solar energy collectors serve the purposes for which they were designed, a serious deterrent to a more widespread use of them resides in the large capital outlay required in initially installing systems incorporating such collectors. The high production costs of such collectors resides primarily in the materials employed and the labor involved. Rather than sacrifice efficiency of the collectors by the use of cheaper materials, a better alternative in reducing production costs is to minimize the labor involved by providing a method of and apparatus for mass producing such collector plates as a large volume operation.

SUMMARY OF THE INVENTION

Accordingly, it is a primary object of the present invention to provide a new and useful method of and apparatus for attaching a piping or fluid conduit system to a heat absorbing collector plate rapidly and smoothly in a mass production operation.

It is another object of this invention to provide a new and useful apparatus for bonding a tube assembly to a heat absorbing plate as part of a substantially continuous assembly operation.

It is a further object of the present invention to combine the foregoing apparatus with a solder dispensing apparatus for continuous operation therewith as a large volume operation.

These and other objects, advantages and characterizing features of this invention will become clearly apparent from the ensuing detailed description of an illustrative embodiment thereof, taken together with the accompanying drawings wherein like reference numerals denote like parts throughout the various views.

BRIEF DESCRIPTION OF THE DRAWINGS

FIG. 1 is a side elevational view of the soldering apparatus constructed in accordance with the principles of this invention;

FIG. 2 is an exploded, perspective view of the tube assembly and absorber plate prior to the assembly thereof;

FIG. 3 is a top plan view of the soldering apparatus of FIG. 1;

FIG. 4 is an end elevational view of the slat conveyor incorporated in the apparatus of this invention;

FIG. 6 is a top plan view of one end of the apparatus of FIG. 1, looking in the direction of arrows 6—6 of FIG. 5;

FIG. 7 is a vertical sectional view, on an enlarged scale, taken along line 7—7 of FIG. 6;

FIG. 8 is an enlarged fragmentary elevational view of the solder-forming rolls used in conjunction with the solder dispensing apparatus incorporated in this invention;

FIG. 9 is an enlarged fragmentary top plan view of a portion of the conveyor embodied in the apparatus of this invention;

FIG. 14 is a vertical sectional view, on an enlarged scale, showing the pressure pad and heater embodied in the apparatus of this invention;

FIG. 15 is a vertical sectional view, taken along line 15—15 of FIG. 14; and

FIG. 16 is a vertical sectional view, on an enlarged scale, taken along the line 16—16 of FIG. 14.

DESCRIPTION OF THE PREFERRED EMBODIMENT

Figure 5:
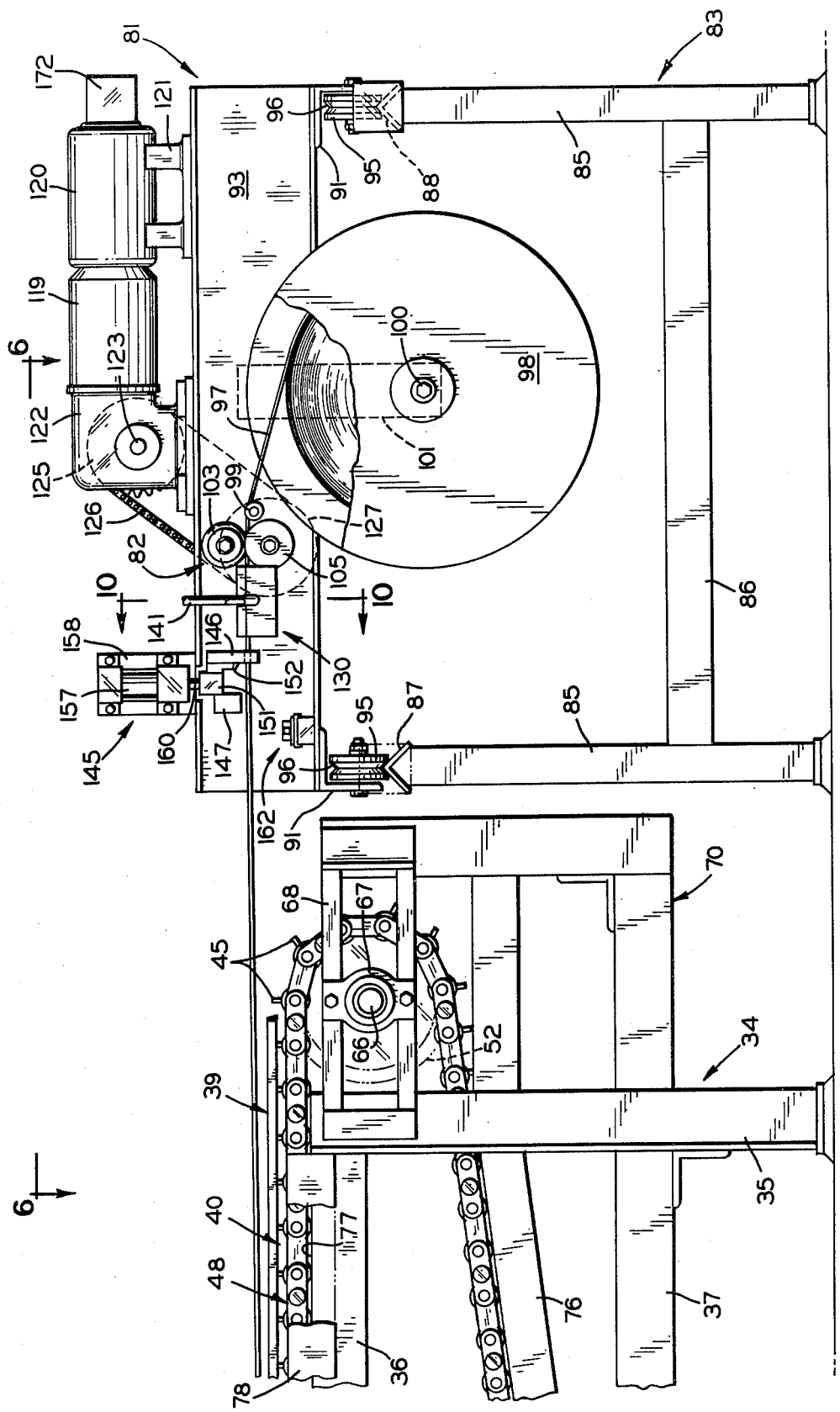
FIG. 5 is a fragmentary, enlarged, side elevational view of one end of the apparatus of FIG. 1, showing details of the solder dispensing means.

Referring now in detail to the illustrative embodiment depicted in the accompanying drawings, there is shown in FIG. 1 a soldering apparatus, comprehensively designated 20, constructed in accordance with this invention for bonding tube assemblies 21 onto thin, metallic heat absorbing plates 22 to form a solar collector panel constituting the principal component of a solar energy collector. As shown in the exploded view of FIG. 2, the plate 22 of the solar collector panel comprises a generally flat body 23 of generally rectangular configuration in plan and can include a peripheral skirt 25 along the marginal edge thereof. The upper surface of plate 22 is formed with a plurality of laterally spaced, longitudinally extending troughs or grooves 26, communicating at their opposite ends with common transversely extending troughs or grooves 27. These latter grooves extend substantially crosswise of the plate 22 and curve outwardly at their one ends, as shown at 28 in FIG. 2, and terminate at the transverse edges of the plate 22. These grooves 26 and 27 are adapted to receive the longitudinal fluid conveying conduits 29 and transverse headers 30, respectively, of the tube assembly 21. Each of the transverse headers 30 have laterally bent portions 31 at their one ends to serve as an inlet or outlet of the final solar collector product for subsequent connection to a fluid piping system. A plurality of longitudinally extending and two transversely extending solder strips 32 and 33 are interposed between the grooves of plate 22 and the tube assembly 21 to effect a bond therebetween upon the melting of the solder during the application of heat thereto. The above-mentioned components of the solar collector panel are loosely placed on the apparatus 20 at the loading station located at the right of the apparatus, as viewed in FIG. 1.

Apparatus 20 comprises a frame 34 including a plurality of upright support posts 35 connected at their upper ends to longitudinally extending horizontal structural members 36 and intermediate their ends to longitudinally extending, horizontal structural members 37. Suitable transversely extending or cross structural members 38 (FIG. 3) are welded or otherwise fixedly secured at their respective opposite ends to structural members 36 and 37, respectively.

Apparatus 20 includes a conveyor 40 adapted to receive and support the loosely assembled plate 22 and tube assembly 21, hereinafter referred to as solar collector unit 39 in a horizontal plane for indexed movement along a predetermined horizontal path from a loading station, identified by numeral 41, to and through a heating station 42 whereat unit 39 is bonded together as an integral structure and then to an unloading station 43 where the finished panel is removed.

As best shown in FIGS. 5 and 6, conveyor 40 is of a slat construction comprising a multiplicity of longitudinally spaced, transversely extending slats 45, each of which is welded or otherwise fixedly secured at each opposite end to a bracket 46 (FIG. 9) suitably secured to a link 47 of a conveyor drive chain 48 located along each side of the conveyor. Each slat 45 is formed with a pair of notches 50 located adjacent the respective opposite ends thereof for a purpose that will hereinafter become apparent.

The laterally spaced drive chains 48 are trained about drive sprockets 51, located at the left of apparatus 20 as viewed in FIG. 1, and idler sprockets 52 located at the opposite end thereof. The drive sprockets 51 are suitably mounted on a drive shaft 53 journalled in spaced bearing blocks 55 and 56 (FIG. 4) and driven by an electric motor 57 connected to a suitable source of electrical power (not shown). Motor 57 is provided with an output shaft 58 connected, through a suitable gear reduction mechanism 60 mounted on frame 34, to a drive shaft 61 having a drive pinion 62 secured thereon. An endless drive chain 63 is trained about pinion 62 and a pinion 65 affixed to the shaft 53 for rotating the latter and the drive sprockets 51.

As shown in FIGS. 5 and 6, the means for mounting the idler sprockets 52 include a transversely extending shaft 66 suitably journalled for rotation in spaced bearing blocks 67 rigidly secured to mounting brackets 68 affixed to a structural framework 70 forming an extension of frame 34. The inactive run of drive chains 48 also are guided about idler sprockets 71 and 72 (FIG. 1) secured on shafts 73 and 75, respectively, suitably mounted on the frame 34.

A pair of laterally spaced rails 76 (only one of which is shown in FIGS. 1 and 5) is suitably mounted on frame 34 to support the inactive runs of the chains 48 of conveyor 40. Likewise, a pair of rails 77 (FIGS. 6 and 14) support the active run of the chains 48. Also, guide rails 78 are provided on the frame 34 to guide the conveyor 40 along its active run and maintain the same in a substantially straight horizontal path. Wear buttons 80 are attached to the outer links of the drive chains 48 and serve as spacers preventing frictional engagement of the drive chains 48 with guide rails 78.

A significant feature of this invention resides in the means for dispensing discrete lengths of solder to the plate and tube assembly 39 during the assembly thereof. Such means includes a carriage 81 carrying the solder dispensing mechanism, generally designated 82, and mounted for reciprocal movement upon a supplemental frame 83 (FIGS. 1 and 5) comprised of upright support posts 85 and horizontally extending structural members 86 connecting the posts 85 together. A pair of track elements 87 and 88 of generally inverted V-shaped configuration in cross section extend along the opposite ends of the frame 83 and are supported on the upper ends of the posts 85. A plurality of equally, longitudinally spaced, notches 89 are formed at the apex of track element 87 for a purpose that will hereinafter be explained.

The carriage 81 comprises a generally U-shaped frame 90 made up of two spaced, parallel angle members 91 and an interconnecting structural cross member 92. A structural channel beam 93 is welded or otherwise fixedly secured at its opposite ends to the angle members 91 intermediate the opposite ends thereof. A pair of longitudinally spaced rollers 95 are rotatably mounted on each of the angle members 91 and are formed with V-shaped grooves 96 complementary to the upper portion of the track elements for rolling movement therealong.

A supply of solder in the form of a continuous flat strip 97 is wound upon a spool 98 rotatably mounted on a shaft 100 detachably secured at one end thereof to a mounting plate 101 affixed to and extending downwardly from structural beam 93. A compression spring 102 (FIG. 7) is mounted on the other end of shaft 100 for providing a slight restraining force on the spool 98. The solder strip 97 is passed over a guide roll 99 and threaded between a pair of forming rolls 103 and 105 which shape the strip into an arcuately shaped configuration in cross section (FIG. 8) and, by virtue of the traction force generated therebetween, feed the strip axially toward the conveyor 40. Forming roll 103 is provided with a convexly curved peripheral surface 106 and the roll 105 with a complementary shaped, concave peripheral surface 107. While not shown in the drawings, the rolls 103 and 105 can be mounted for vertical adjustment toward and away from each other for facilitating initial solder strip threading therebetween and to accommodate solder strips of varied thicknesses.

The rolls 103 and 105 are rigidly secured to rotatable shafts 108 and 110 extending through sleeve bushings 111 and 112 mounted in bushing blocks 113 and 115, respectively, secured to beam 93 by suitable fasteners 116. Intermeshing gears 117 and 118 are suitably rigidly secured to the other ends of shafts 108 and 110 for effecting rotation of the same in unison. The means for rotating the shafts 108, 110 includes an electric motor 120 mounted on a support cradle 121 carried by beam 93 and connected to a suitable source of electrical power (not shown). Motor 120 is connected, via a clutch brake 119 and a suitable gear reduction mechanism 122 mounted on beam 93, to a drive shaft 123 having a suitable clutch mechanism 124 secured thereto and provided with a drive pinion 125. A drive chain 126 is trained about pinion 125 and a pinion 127 affixed to the shaft 110 for rotating the latter and thereby forming rolls 103 and 105 via intermeshing gears 117 and 118.

The purpose of clutch brake 119 is to positively stop the drive train upon deenergization of motor 120 and clutch 124 is operative to interrupt operation of the forming rolls upon the occurrence of a malfunction of the solder feed operation, such as solder strip jam up for example.

Figure 10:
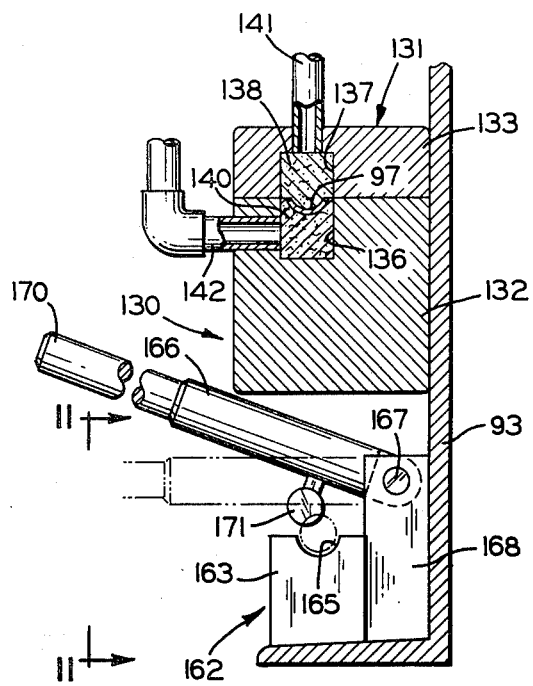
FIG. 10 is a vertical sectional view, on an enlarged scale, taken along line 10—10 of FIG. 5.

After being formed to the desired configuration, the continuous solder strip 97 passes through a flux applicator, generally designated 130. As best shown in FIG. 10, the flux applicator 130 comprises a housing 131 having a lower portion 132 suitably secured to beam 93 and an upper portion 133 secured to portion 132 as by a quick release arrangement (not shown), such as a toggle linkage for example, to facilitate initial threading of the solder strip therethrough. The housing portions 132 and 133 are formed at their interfaces with aligned cavities 136 and 137 to form a composite chamber 138 through which the solder strip 97 passes. The chamber 138 is filled with an elastic, porous, liquid absorbing material 140 for receiving and retaining a suitable flux composition. The flux preferably is suitably metered under pressure into cavities 136 and 137 by supply conduits 141 and 142, respectively, connected to a suitable supply source of flux under pressure. The delivery of the flux to both cavities, as illustrated, insures wetting of both surfaces of the solder strip 97. Thus, as the solder strip is fed axially through chamber 138, the porous, flux-absorbent material 140 is effective to wet both surfaces of the strip 97 with flux to clean and free such surfaces from oxides and promote their union with the tube assembly 21 and plate 22.

Figure 13:
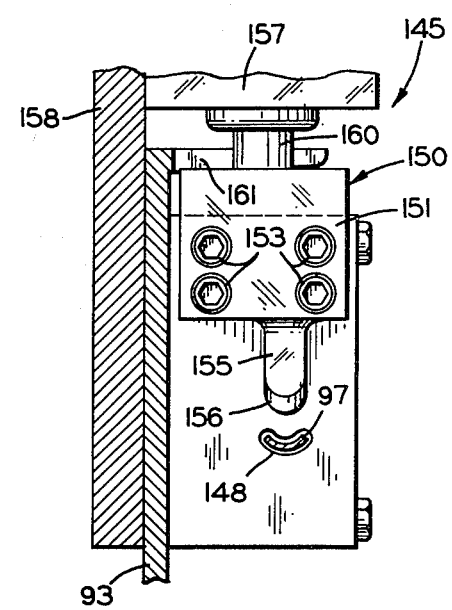
FIG. 13 is a vertical sectional view, taken along line 13—13 of FIG. 12.
Figure 12:
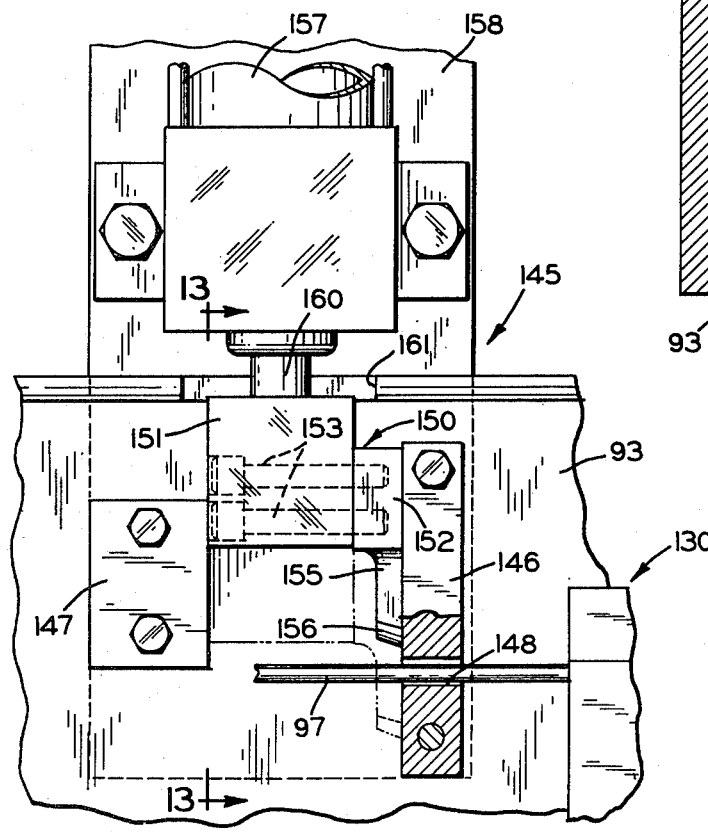
FIG. 12 is a fragmentary, enlarged side elevational view, partially in section, of a portion of the apparatus of FIG. 1.

Means are provided for cutting the solder strip 97 into discrete lengths for placement in the grooves formed in absorber plate 22. Such means, identified generally by reference numeral 145, is located downstream of the flux applicator 130 and includes horizontally spaced guide members 146 and 147 (FIGS. 12 and 13) rigidly secured to the web of beam 93 by suitable fasteners. Guide member 146 projects downwardly past member 147 and is formed with an arcuately shaped opening 148 through which the solder strip 97 passes. The configuration of opening 148 conforms generally to the shape of the preformed strip to prevent distortion of the latter out of its desired transverse curvature during cutting. The members 146 and 147 serve as guides for a reciprocal cutter 150 comprised of a tool carrier 151 and a cutting tool 152. The cutting tool 152 is releasably secured to the carrier 151 by a plurality of screws 153 and is formed with a blade 155 having a tapered, knife edge 156 on the distal end thereof.

The means for reciprocating cutter 150 includes a fluid actuating cylinder 157 secured to a vertical mounting plate 158 welded or otherwise rigidly secured to the web of beam 93. The cylinder 157 is provided with the usual piston (not shown) connected to a piston rod 160 projecting downwardly through a recess 161 formed in the upper flange of beam 93 and attached to the cutter 150. Extension of the piston rod 160 lowers the cutter 150 to slide blade edge 156 along the rear face of guide member 146 and sever the strip 97 therebetween.

Figure 11:
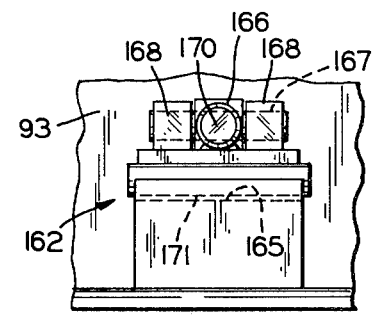
FIG. 11 is an end elevational view of a solder strip preformer used in conjunction with this invention and looking in the direction of arrows 11—11 of FIG. 10.

When necessary to thread the leading end of the continuous solder strip 97 through rolls 103 and 105, it is desirable to preform the starting portion of the strip in order to facilitate the threading thereof between such rolls 103 and 105 and through the flux applicator 130 and cutting means 145. To this end, and as best shown in FIGS. 10 and 11, a solder preforming unit 162 is mounted on beam 93 and comprises a base member 163 having an arcuately shaped groove 165 formed in the upper face thereof for receiving the solder strip 97. An elongated rod 166 is mounted in its one end on a pivot pin 167 suitably journalled in bearing blocks 168 secured to the beam 93 and is provided with a handle 170 at its other end. The rod 166 is provided with a work-engaging tool 171 having an arcuate surface complementary to the concave surface of the groove 165 for shaping the strip into its desired cross sectional curved configuration. A sufficient length of the strip 97 is thus preformed to thread the same between the adjustably spaced forming rolls 103 and 105 and successively through the opened flux applicator 130 and the arcuate opening 148 of cutting means 145.

In assembling the components of the solar collector at loading station 41, a heat absorbing plate 22 is placed on the conveyor 40 in a manner orienting the longitudinal grooves 26 normal to conveyor slats 45 with grooved portions 28 being accommodated in the slat notches 50. Successive cut strips 32, 33 of solder are then placed in the longitudinal and transverse grooves 26 and 27 of plate 22. When placing the strips 32 into longitudinal grooves 26, the carriage 81 is indexed along track elements 87 and 88 by moving the same a given increment, as determined by the dropping of rollers 95 into notches 89, to align each successive fed strip 32 with its corresponding successive groove 26. If desired, a plurality of solder dispensing mechanisms 82 can be mounted on carriage 81 for simultaneously feeding a plurality of strips to reduce production time. While the formed, cut strips are handled manually for placement into the grooves 26 and 27, as well as indexing of the carriage 81, it should be appreciated that a suitable control system can be employed to perform these functions automatically in a sequentially timed relation.

It should also be noted that a counter mechanism, diagrammatically shown at 172 in FIGS. 1 and 5, is operatively connected to motor 120 for generating a signal upon the completion of a predetermined number of revolutions to deenergize the motor and, via clutch brake 119, positively interrupt operation of the rolls 103 and 105. While not shown, a suitable electric control system can be incorporated in solder dispensing mechanism 82 to effect actuation of cutter 150 upon termination of solder feed to shear off a discrete length of strip. Thus, specific linear lengths of solder strips can be formed by correlating the number of revolutions of motor 120 necessary to obtain the lengths desired and controlling the feed of solder strip accordingly.

After the solder strips 32, 33 are placed in their respective grooves 26, 27, the tube assembly 21 is positioned in place. The conveyor 40 is then indexed to advance the loosely assembled unit 39 to the heating station 42, whereat is located a pressure pad, generally designated 175 (FIG. 14), mounted on a frame 176 and suspended above conveyor 40 for vertical reciprocal movement relative thereto and a radiant heater, generally designated 177, mounted on the frame 176 below conveyor 40.

The frame 176 includes two vertically disposed columns 178 located at each side of conveyor 40 and spaced longitudinally therealong with the columns on opposite sides of the conveyor being laterally aligned. The columns 178 extend from horizontal members 37 and are tied together at their upper ends by horizontally disposed angle members 180 extending transversely of the conveyor and secured adjacent their opposite ends to the aligned columns 178 to form a rigid, box-like structure.

As best shown in FIGS. 14 and 16, the pressure pad 175 comprises a frame 181 of generally rectangular shape in plan comprising a pair of laterally spaced side walls 182 and a pair of end walls 183. A pair of horizontal plates 185 extend lengthwise of the frame 181 and project inwardly of the side walls 182. A plurality of laterally, equally spaced, elongated slats 186 are welded or otherwise suitably fixedly secured to the undersides of plates 185 and side walls 182 and are provided with edge surfaces 187 for bearing engagement against the tube assembly 21 of the loosely assembled collector unit. These slats 186 are adapted to be vertically aligned with the conveyor slats 45 when the collector unit is indexed and properly positioned in the heating station 42. The slats 186 also are provided with notches 188, the purpose thereof, as well as notches 50 of slats 45, being to accommodate the enlarged diameters of header bent portions 31 while allowing full engagement of the slat edge surfaces against the opposite sides of the loosely assembled collector unit.

The means for supporting the pressure pad 175 on frame 176 includes a plurality of jack screw assemblies 190 mounted on the horizontal legs of angle members 180. Each of the jack screw assemblies 190 comprises an elongated screw 191 fixedly secured at its lower end to a resiliently yieldable pad assembly 192 affixed to the plates 185 of frame 181 and extending upwardly through a suitable opening 193 in angle member 180 and a rotatable nut (not shown) journalled for rotation in a jack screw casing 194 but fixed against axial movement therein. Thus, rotation of the several nuts effect axial movement of the screws 191 to lower or raise the pressure pad 175.

As shown in FIGS. 14 and 16, each pad assembly 192 comprises a lower or first plate 195 suitably fixed to horizontal plate 185 and a second or upper plate 196 affixed to the lower end of jack screw 191. A plurality of shoulder head cap screws 197 extend through the upper plate 196 and are threaded at their lower ends in plate 195. A helical compression spring 198 encircles each screw 197 with its opposite ends bearing against the opposed surfaces of plates 195 and 196. These springs 198 urge the plate 196 away from plate 195 and serve to cushion the impact or downward thrust of the associated jack screw 191 so that the upper slats 186 engage the tube assembly with only sufficient clamping force to maintain and ensure good thermal contact between the tube assembly 21, solder strips 32, 33, and plate 22 but not great enough to collapse or deform the tubular conduits of tube assembly 21. Also, the springs 198 exert constant pressure as the spacing between plates 195 and 196 change due to the melting of the solder and the flow displacement thereof. Preferably, four such shoulder head cap screws 197 and springs 198 are employed in each pad assembly 192.

The means for rotating the nuts of the several jack screw assemblies 190 include an electric motor 200 mounted on a plate 201 rigidly secured to column 178 and connected to a suitable source of electrical power (not shown). The motor 200 is connected through a suitable gear reduction mechanism 202 to an output shaft 203 having a suitable clutch 204 mounted thereon and which is provided with a drive sprocket 205. The sprocket 205 drives an endless drive chain 206, also entrained about an idler sprocket 207 (FIG. 15) and a pair of drive sprockets 208 and 210, mounted on transversely extending drive shafts 211 and 212, respectively. Each of the drive shafts 211, 212 is journalled for rotation in spaced bearing blocks 213 and 215 mounted on the horizontal leg of angle member 180 and provided with a pair of axially spaced worms (not shown) engageable with the rotatable nuts associated with jack screw assemblies 190. Thus, synchronous rotation of the shafts 211 and 212 by sprockets 208, 210 and drive chain 206 as described above, effects raising and lowering of screws 191 to elevate or lower pressure pad 175, as desired.

The heater 177 is disposed immediately below the conveyor 40 in vertical registry with the loosely assembled collector unit 39 when the latter is properly positioned in the heating station 42. The heater 177 comprises a radiant heat panel 220 in the form of a rectangularly shaped, box like frame having a pair of spaced side walls 221 and end walls 222 connected at their lower ends by a bottom wall 223. The frame supports a bed 225 of porous, rigidified fibrous refractory material through which a gaseous fuel, preferably a gas-air mixture, is circulated for combustion to produce a uniform, low level flame along substantially the entire upper surface of the bed 225. An inlet 226 is formed in one of the side walls 221 and is connected by a conduit 227 to a suitable source of such gas-air mixture. A smaller inlet connection 228 also is formed in the side wall 221 slightly above the porous bed 225 to provide a pilot flame. An exhaust hood 230 (FIG. 1) is suitably mounted on the frame 176 in the heating station 42 above the pressure pad 175 to accumulate or collect and remove any exhaust gases generated by the combustion of the gas-air mixture in heater 177, as well as emissions from the solder flux composition.

While not shown, a suitable electric control system can be incorporated in apparatus 20 so that when the loosely assembled collector unit is indexed to its proper position within the heating station 42 by conveyor 40, a limit switch or other suitable detection device can be activated to energize motor 200 for lowering the pressure pad 175 onto the unit. The aforementioned detection device can also initiate actuation of a suitable timer controlling operation of the heating cycle. The timing of this control is such that when the pressure pad 175 engages the tube assembly 21 to gingerly clamp the latter to absorber plate 22, the fuel gases are introduced into the porous bed 225 via conduit 227 and inlet 226 for combustion to produce the necessary heat to melt solder strips 32 and 33 and effect bonding of the tube assembly 21 to plate 22. As the solder melts, it flows laterally and wets the surfaces of the grooves 26,27 and conduits 29 and headers 30 of the tube assembly 21 to cover a substantially large arcuate area of the contact surfaces to form a good mechanical and thermally conductive metallurgical bond therebetween. After a predetermined time, the flow of combustion gases into bed 225 is interrupted and a dwell time is initiated to allow the melted solder to solidify. Immediately thereafter, the pressure pad 175 is raised to disengage the same from the unit into its elevated position. The conveyor 40 is then indexed to advance the finished bonded assembly or panel out of the heating station 42 to unloading station 43 for removal from conveyor 40.

It should be noted that the radiant heater 177 is intermittently operable to generate heat only for melting the solder when the loose assembly is properly positioned and held together by the pressure pad 175. The heater 177 is operative for only about 80 seconds to not only significantly conserve fuel, but also to drastically reduce production time is a large volume operation. Moreover, the heater is operative to immediately generate the required heat upon combustion of the fuel delivered into bed 225 and is immediately cooled upon the termination of such combination. Thus, bed 225 does not retain residual heat and allows the melted solder to cool and solidify rapidly for effecting the bond.

From the foregoing, it is apparent that the objects of this invention have been fully accomplished. As a result of this invention, a new and useful method and apparatus is provided for fabricating an integral tube and absorbing plate panel for a solar energy collector in an assembly line operation to significantly reduce the labor involved. A solder dispensing apparatus is used in conjunction with the foregoing apparatus to feed discrete lengths of a solder strip and impart a desired transverse configuration thereto during the assembly of the components forming the panel.

It is to be understood that the form of the invention herein shown and described is to be taken as an illustrative embodiment only of the same, and that various changes in the shape, size and arrangement of parts, as well as various procedural changes, may be resorted to without departing from the spirit of the invention.

We claim:

1. A method of fabricating solar collector panels comprising: providing a thermally conductive, heat absorbing sheet having a plurality of elongated grooves extending in one direction along said sheet, said grooves disposed in a laterally spaced relation, feeding discrete lengths of solder strips from a solder dispenser in said one direction sequentially into said grooves, respectively, indexing said solder dispenser transversely of said one direction after feeding each strip of solder into the respective groove thereof, forming said solder strips into desired transverse configurations before placement thereof into said grooves, positioning a tube assembly on said sheet, said tube assembly having a plurality of laterally spaced conduits disposed in said grooves of said sheet in superimposed relation on said solder strips to form a loosely assembled unit, holding said unit together, and heating said unit to melt said solder strips and effect a thermal conductive bond between said tube assembly and said sheet.

2. A method according to claim 1, wherein said discrete lengths of solder strips are formed by severing said lengths from a continuous strip of solder supply.

3. A method according to claim 2, including applying flux to the opposite sides of said continuous strip prior to the severance thereof into discrete lengths.

* * * * *